United States Patent [19]
Gorton

[11] Patent Number: 5,989,416
[45] Date of Patent: *Nov. 23, 1999

[54] WASTEWATER TREATMENT SYSTEM

[76] Inventor: Stuart Albert Gorton, 2953 W. 116th Pl., Apt. 206, Westminster, Colo. 80234

[*] Notice: This patent issued on a continued prosecution application filed under 37 CFR 1.53(d), and is subject to the twenty year patent term provisions of 35 U.S.C. 154(a)(2).

[21] Appl. No.: 08/971,083

[22] Filed: Nov. 14, 1997

Related U.S. Application Data

[63] Continuation-in-part of application No. 08/895,700, Jul. 17, 1997.

[51] Int. Cl.⁶ .................................. C02F 3/04; C02F 9/00
[52] U.S. Cl. .................. 210/151; 210/170; 210/259; 210/265; 210/293; 210/456; 210/472; 210/519; 210/532.2; 210/232; 210/196; 210/197; 210/295; 405/43; 405/50
[58] Field of Search .................................. 210/154, 150, 210/151, 170, 456, 532.2, 196, 197, 248, 232, 252, 259, 265, 287, 291, 293, 295, 472, 519; 404/2, 3, 4, 5; 405/36, 43, 45, 50

[56] References Cited

U.S. PATENT DOCUMENTS

| | | |
|---|---|---|
| 1,406,068 | 2/1922 | Padgett . |
| 2,436,593 | 2/1948 | Moselowitz . |
| 2,607,727 | 8/1952 | Butler ....................................... 210/170 |
| 2,701,027 | 2/1955 | Scoville . |
| 2,802,339 | 8/1957 | Fogerty ..................................... 210/170 |
| 3,225,545 | 12/1965 | Flegel . |
| 3,562,969 | 2/1971 | Little, Jr. . |
| 3,680,704 | 8/1972 | Schaefer .................................. 210/170 |
| 4,100,073 | 7/1978 | Hopcroft . |
| 4,293,421 | 10/1981 | Green ........................................ 210/170 |
| 4,486,310 | 12/1984 | Thornton . |
| 4,640,643 | 2/1987 | Williams ...................................... 404/4 |
| 4,714,558 | 12/1987 | Barbee et al. . |
| 4,818,384 | 4/1989 | Mayer . |
| 4,971,690 | 11/1990 | Justice ...................................... 210/170 |
| 5,017,040 | 5/1991 | Mott ......................................... 210/170 |
| 5,026,202 | 6/1991 | Thomann ..................................... 404/4 |
| 5,207,896 | 5/1993 | Graves . |
| 5,306,425 | 4/1994 | Graves . |
| 5,360,556 | 11/1994 | Ball et al. . |
| 5,409,603 | 4/1995 | Tsung ....................................... 210/169 |
| 5,441,631 | 8/1995 | Stegall, Sr. et al. . |
| 5,460,722 | 10/1995 | Chen ........................................ 210/169 |
| 5,525,230 | 6/1996 | Wrigley et al. . |
| 5,527,454 | 6/1996 | Ponte et al. . |
| 5,618,431 | 4/1997 | Kondo et al. . |
| 5,639,364 | 6/1997 | Houck et al. ............................ 210/170 |
| 5,645,367 | 7/1997 | Gunter ......................................... 404/2 |
| 5,707,513 | 1/1998 | Jowett et al. ............................ 210/170 |

FOREIGN PATENT DOCUMENTS

| | | | |
|---|---|---|---|
| 57-127488 | 8/1982 | Japan ....................................... 210/170 |
| 2-13624 | 1/1990 | Japan ....................................... 210/170 |

OTHER PUBLICATIONS

Product Information on Small Recirculating Sand Filters for Individual Homes, published no earlier than Mar. 1994, pp. 310–318.

Guidelines for Intermittent Sand Filters, Orenco Systems Incorporated, dated Jun. 22, 1994.

Sand Filters and Shallow Drainfields, Orenco Systems Incorporated, dated Feb. 8, 1994.

Installation Guide for Intermittent Sand Filters, Orenco Systems Incorporated, Dated Feb. 11, 1994.

Intermittent Sand Filters, Orenco Systems Incorporated.

*Primary Examiner*—Robert J. Popovics
*Attorney, Agent, or Firm*—Sonnenschein Nath & Rosenthal; Jennifer H. Hammond

[57] ABSTRACT

A filter bed base for the treatment of wastewater discharged from a dwelling, business or like producer. The filter bed base is generally rectangular in shape and includes an upper and lower surface. The upper surface of the filter bed base has a plurality of orifices for distributing filtered effluent into various chambers inside the base. The lower surface of the base has a plurality of orifices which are positioned beneath a select number of the chambers for discharging a portion of the filtered effluent into the soil underlying the base.

7 Claims, 6 Drawing Sheets

FIG. 3a (SECTION 3-3)

FIG. 3b

FIG. 4 (SECTION 4-4)

WASTEWATER TREATMENT SYSTEM

This application is a continuation in part of U.S. application Ser. No. 08/895,700, filed Jul. 17, 1997.

BACKGROUND OF THE INVENTION

This invention relates to a wastewater treatment system and more particularly to a wastewater treatment system which improves the manner in which effluent is dispersed into the environment.

Small wastewater treatment systems are typically designed so that raw wastewater generated by a business or residence is discharged directly into a septic tank. Once discharged into the septic tank, the effluent is allowed to partially settle and is then passed into a dosing chamber. From the dosing chamber, the effluent is fed into a filter media, e.g. trickling filter bed and then collected in a central drain pipe. If the filter bed is a recirculating bed, the effluent is then directed toward a flow splitting device which separates the flow of the effluent. A portion of the effluent is then directed back into the filter bed while the remaining effluent is discharged into the environment. Because the remaining effluent is centrally located in the drainage pipe, it can be discharged expediently from a single point, often above ground. If, however, the filter bed is a single pass bed, none of the effluent is recirculated through the filter. Thus, there is no need for a flow splitting device. Once collected in the central drain pipe, the effluent passes directly to a central location, typically above ground, where it is then discharged into the environment.

While above ground discharge is the most expedient means of releasing effluent into the environment, it is quickly becoming an unacceptable means of discharge. Most adjoining property owners vehemently oppose having effluent from a nearby wastewater treatment facility draining across their land. Even having been treated, the effluent often produces noxious odors.

To resolve this problem, the effluent, instead of being discharged above ground, is discharged below ground through the use of either a gravity fed lateral field or a pressurized lateral field. A lateral field, whether gravity fed or pressurized, is traditionally comprised of a plurality of parallel drain pipes positioned generally equidistant from one another across a specified area underneath the ground. Once the effluent is collected in the central drain pipe, the effluent is then dispersed to the plurality of drain pipes for discharge into the environment. Each drain pipe in the lateral field has a plurality of orifices (i.e. small openings or holes) which allow the effluent to be released into the surrounding environment.

While the lateral fields have served as an effective means to discharge effluent below ground, the lateral fields are not without problems. One problem common to both types of lateral fields is that they are costly to install and require additional land. Additionally, the gravity fed lateral fields, in particular, often discharge large quantities of effluent in a relatively small area instead of evenly distributing the effluent across the field. While pressurized lateral fields help to combat the problem of inadequate distribution, the pressurized fields are even more costly than the gravity fed lateral fields because they not only require additional land but also an additional pump and pumping basin.

The present invention overcomes these and other problems that are inherent with existing wastewater treatment systems by providing a system which is cost-effective, easy to install, easy to manufacture, easily expanded, and evenly distributes high quality effluent to the soil without the use of separate flow splitting devices, gravity fed lateral fields, or separate pressurized lateral fields.

SUMMARY OF THE INVENTION

The principle object of the present invention is to provide a filter bed which incorporates all the advantages and functions generally provided by both a flow splitting device and a lateral field.

Accordingly, the general objects of the invention are to provide a filter bed that:

(1) disperses its effluent below ground without the use of a separate lateral field;

(2) distributes the effluent evenly, underground, without the use of a separate pressurized lateral field, pump and pumping basin;

(3) does not require a separate flow splitting device;

(4) is easily expanded to serve the needs of larger hydraulic demands;

(5) is easily and quickly installed; and (6) is easy to manufacture.

In accordance with these objects, the present invention provides a filter bed base for the treatment of wastewater discharged from a dwelling, business or like producer. The filter bed base is generally rectangular in shape and has an upper and lower surface. The upper surface of the filter bed base has a plurality of orifices for distributing filtered effluent into various chambers inside the base. The lower surface of the base has a plurality of orifices which are positioned beneath a select number of the chambers for discharging a select portion of the filtered effluent into the soil underlying the base.

These and other objects and advantages of the present invention will be clarified in the following description of the preferred embodiment in connection with the drawings, the disclosure and the appended claims, wherein like reference numerals represent like elements throughout.

DESCRIPTION OF THE PREFERRED EMBODIMENT

While the novelty of the present invention lies in the structure and operation of the filter bed 10, as shown in FIGS. 1–6, it is helpful to the understanding of the invention to illustrate the filter bed 10 as it would function and appear in a typical wastewater treatment process. It is understood, however, that the filter bed 10, and more particular the filter bed base 60 (i.e. the drainage and discharge system), can be used in connection with a variety of other wastewater treatment apparatuses or processes and that only the best mode contemplated for carrying out the present invention is herein shown and described.

Figure 1:
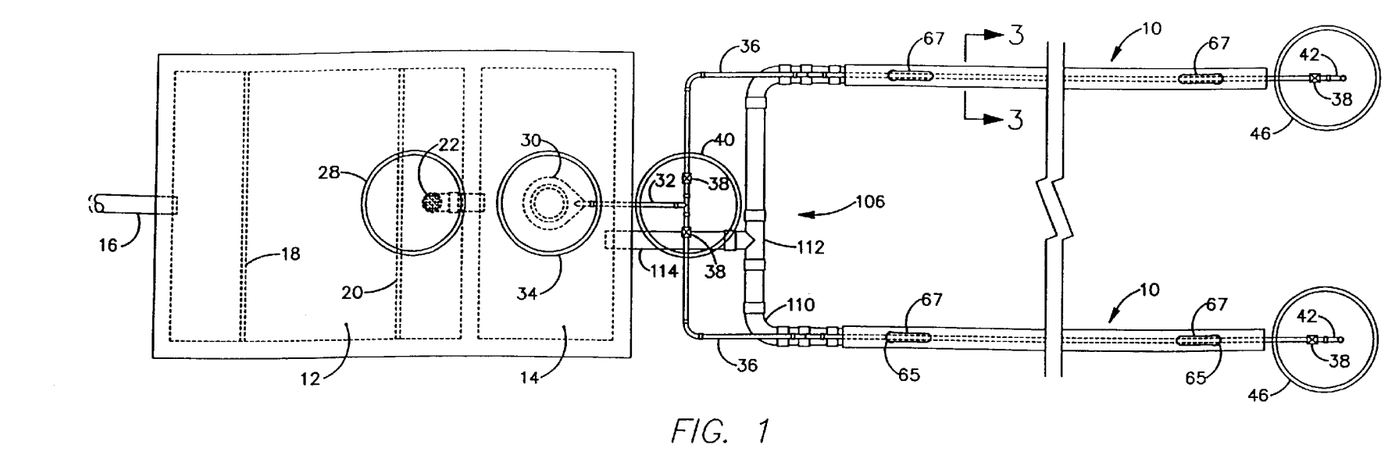
FIG. 1 is a plan view of one embodiment of the present invention as well as all appurtenances required for the operation of a small wastewater treatment system.
Figure 2:
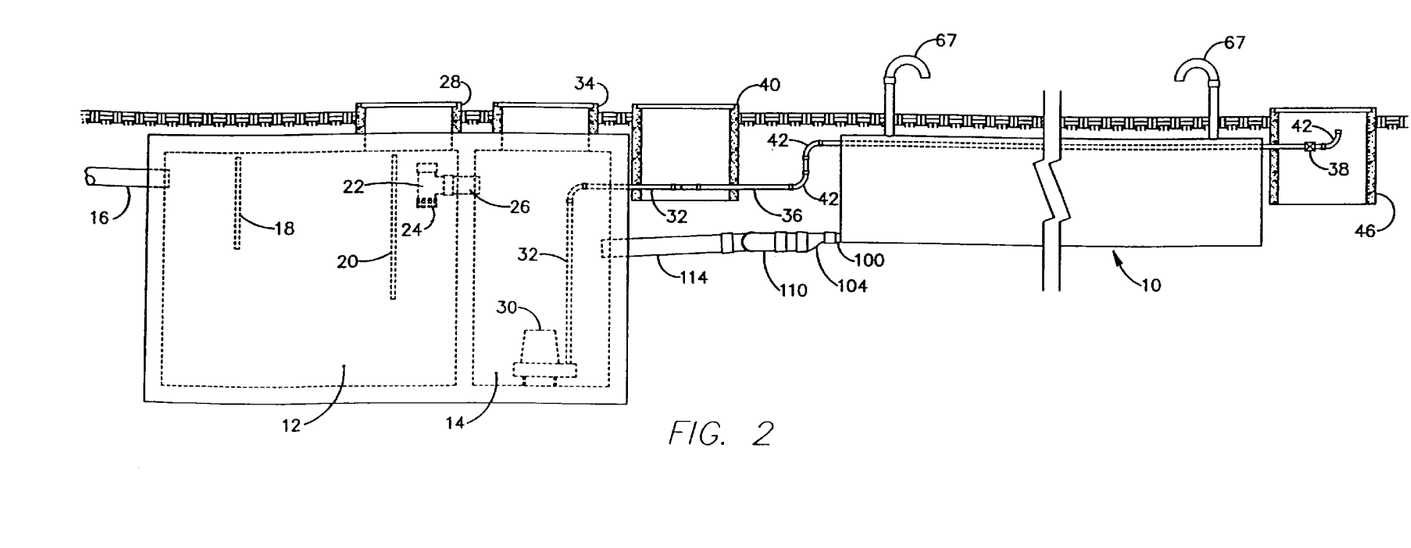
FIG. 2 is a side view of the present invention, as illustrated in FIG. 1, and all appurtenances required for the operation of a small wastewater treatment system.

Referring now to the drawings, FIGS. 1 and 2 illustrate the general configuration of a small wastewater treatment process, utilizing a series of two interconnected filter beds 10, a septic tank 12, and a pumping chamber 14. As seen in FIGS. 1 and 2, an inlet pipe 16 from a dwelling, business, or like producer, is connected to the septic tank 12 which contains an inlet baffle 18, an outlet baffle 20 and a removable tee fitting 22. A non-corrosive, mesh filter fabric 24 is generally stretched across the bottom opening and sides of the removable tee fitting 22 and secured in this position with a stainless steel hose clamp. Removable tee fitting 22 is typically a 4 inch diameter polyvinyl chloride (PVC) tee that is secured to a connecting pipe 26, which leads into pumping chamber 14. Access to the removable tee fitting 22 is provided through a first covered access vault 28.

The pumping chamber 14 contains a pump 30, and a primary distribution pipe 32. Access to pump 30 is provided through a second covered access vault 34. Although FIGS. 1 and 2 show septic tank 12 and pumping chamber 14 as being a single integral unit, they can be separate.

The primary distribution pipe 32, upon exiting the pumping chamber 14, splits into secondary distribution pipes 36. Although FIGS. 1 and 2 only depict two secondary distribution pipes 36, it is recognized in the art that the primary distribution pipe 32 can split the flow of effluent through a plurality of secondary pipes 36 or through only one secondary distribution pipe 36. Likewise, while the diameter of these secondary pipes 36 may vary, they are typically 1½ inch diameter pressure rated PVC pipes. Access to these secondary distribution pipes 36 and associated plug valves 38 is provided by way of a third covered access vault 40.

Just beyond the third covered access vault 40, pipe elbows 42 are installed to extend the secondary distribution pipes 36 over and across the filter beds 10. Directly over the filter beds 10, the secondary distribution pipes 36 have regularly spaced pressurized orifices 44 (i.e. small openings or holes) which allow the discharge of the effluent over the filter media 48. (See FIG. 3a). After passing over the filter beds 10, the secondary distribution pipes 36 then enter a fourth covered access vault 46 where access to plug valves 38 and to pipe elbows 42 is provided.

Figures 3A, 3B:
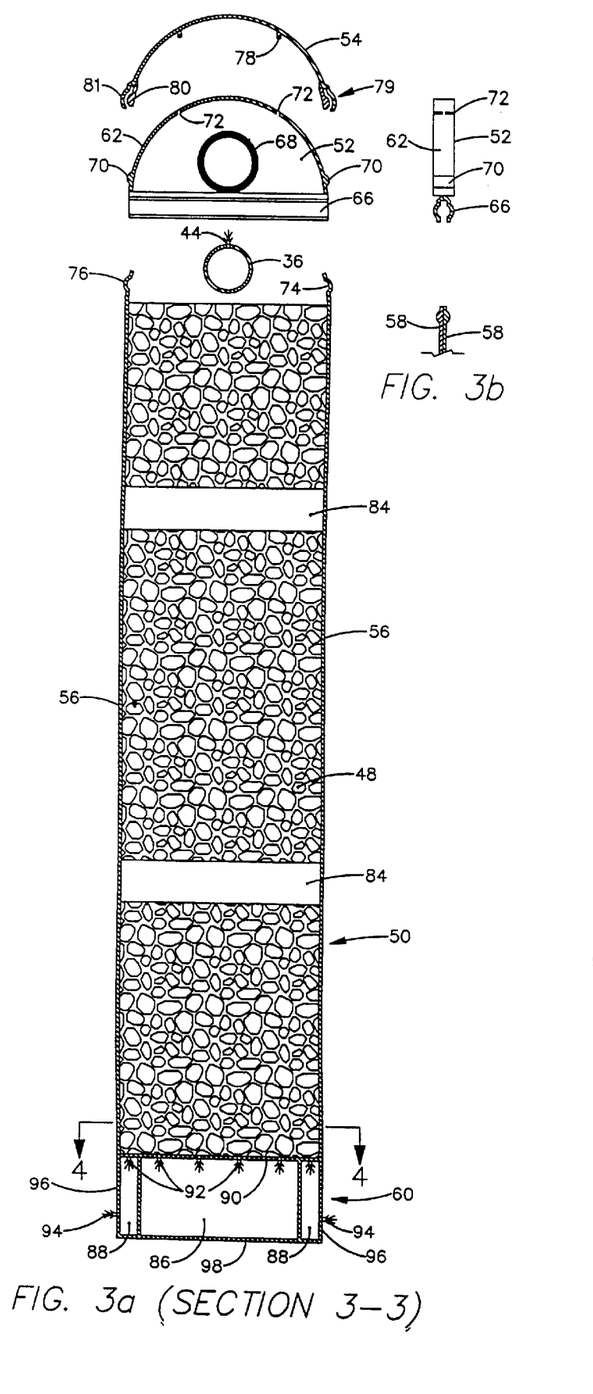
FIG. 3a is an exploded, cross-sectional view of the filter bed section depicted in FIG. 1 along lines 3—3.
FIG. 3b is a side view of the filter bed connector shown in FIG. 3a, illustrating the means by which the filter bed connector connects two abutting filter bed housings.
Figure 4:
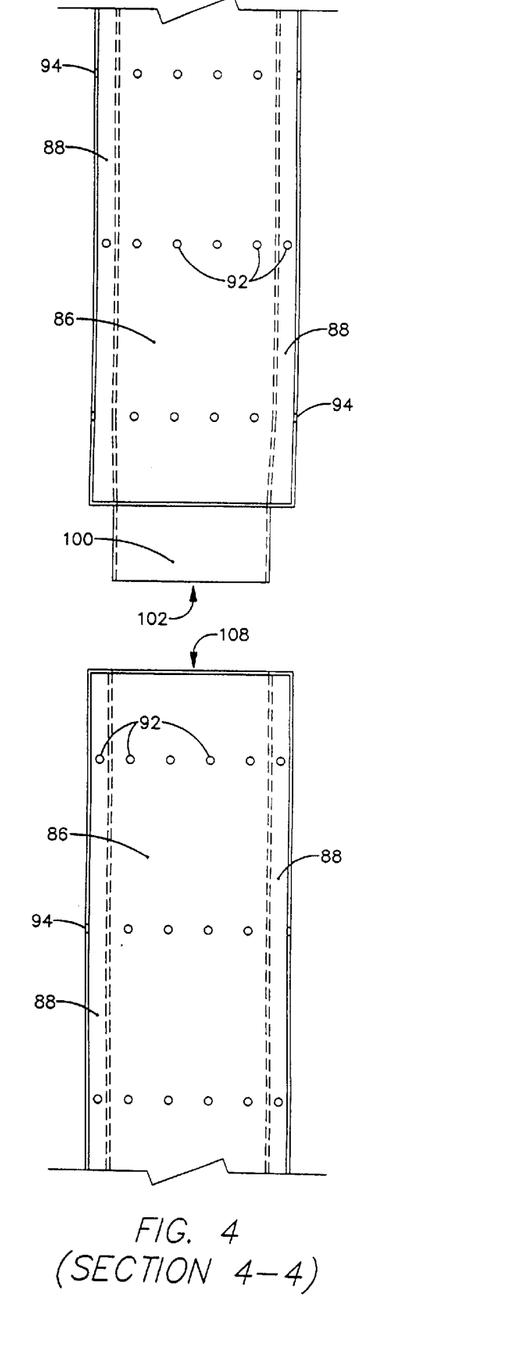
FIG. 4 is an exploded cross-sectional plan view of the orifice layout depicted in FIG. 3a along lines 4—4.
Figures 5, 6:
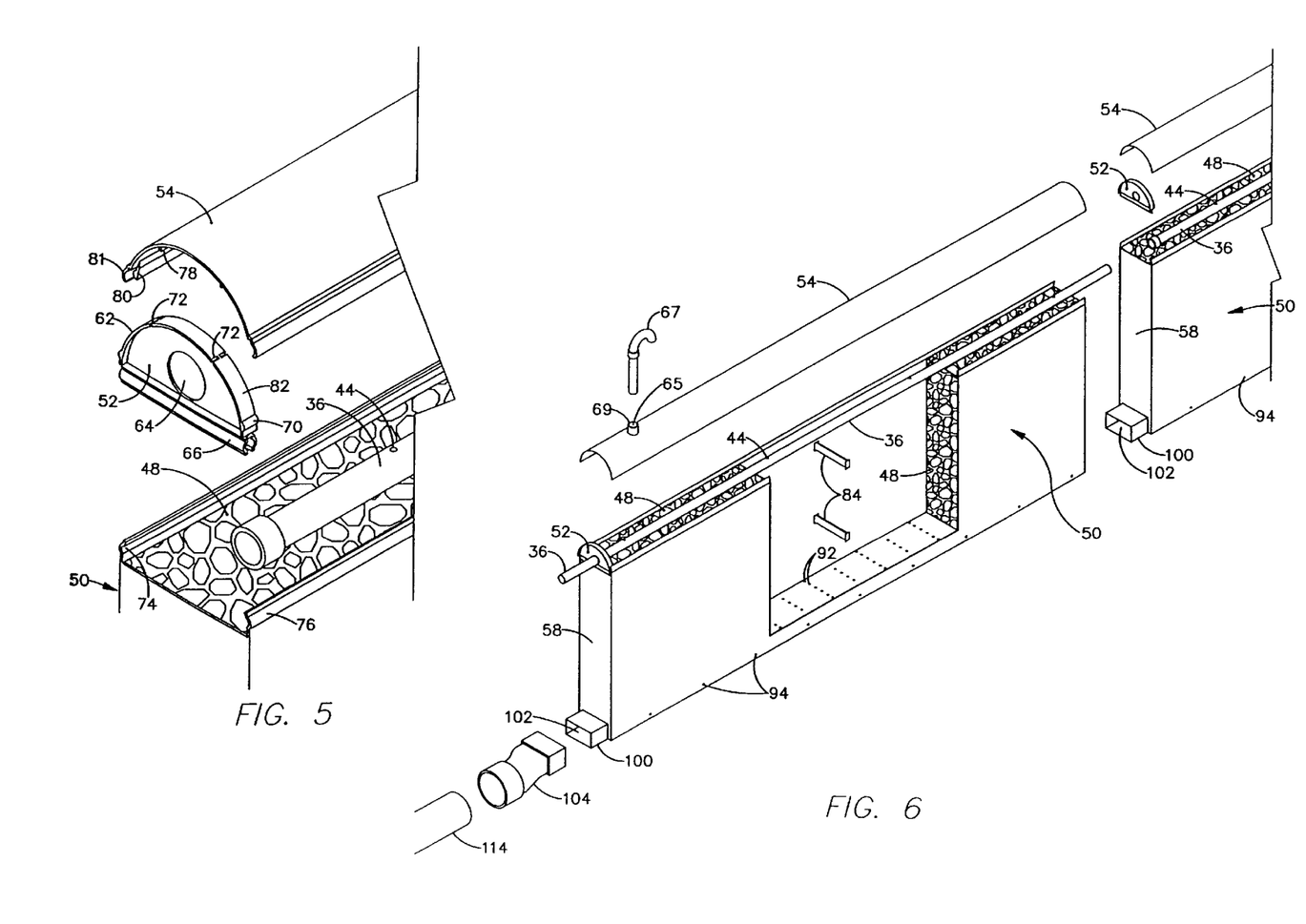
FIG. 5 is an exploded perspective view of the filter bed in FIG. 1, illustrating the construction components of the filter bed and the manner in which the components fit together.
FIG. 6 is a partially exploded, fragmentary perspective view of two adjoining filter bed sections.

As seen in FIGS. 3a–6, the filter beds 10 are comprised of three main components: a filter bed housing 50, a filter bed connector 52 and a filter bed cover 54. The filter bed housing 50, as illustrated in FIGS. 3a and 6, is the framework for a single filter 10 unit. As seen in FIGS. 1–6, a single filter bed 10 can be used alone in the operation of the system or multiple filter beds 10 can be connected in series by interconnecting the filter bed housing 50 of each filter bed 10 to adjoining filter bed housings 50.

The filter bed housing 50 comprises (1) opposing side walls 56; (2) opposing end panels 58; and (3) a filter bed base 60. The opposing side walls 56 and end panels 58 create a generally rectangular shaped opening for receiving filter media 48 and the filter bed base 60, or collecting chamber, serves as the drainage and discharge unit for the treatment system. While this embodiment illustrates the filter bed housing 50 as being generally rectangular in shape, alternative dimensional configurations may be used (i.e. tubular shaped structure).

As seen in FIGS. 5 and 6, the design of the filter bed 10 components allows one filter bed housing 50 to easily fasten to an adjoining filter bed housing 50. The components fit together to form one cohesive integral unit and to easily allow the installation of subsequent units if the volume of effluent should increase.

As shown in FIGS. 5 and 6, the filter bed connectors 52 act not only to secure adjoining filter bed covers 54 but also to secure the end panels 58 of abutting filter beds 10 to one another. Each connector 52 has a pipe opening 64 for receiving the distribution pipes 36 and a clipping piece 66 which clips over the end panels 58 of both adjoining filter beds 10. See FIGS. 3a and 3b. By clipping over both end panels 58, the clipping piece 66 prevents untreated effluent from seeping down between the adjoining filter beds 10.

Also, as seen in FIG. 3, a gasket 68 is provided around the pipe opening 64 in the filter bed connectors 52 to provide a water tight seal around the distribution pipes 36 running across the filter bed media 48. It is recognized that the gasket 68 is only necessary on the first and last connector 52 in a series and that the pipe opening 64 of the filter bed connectors 52 is slightly larger than the outside bell diameter of the distribution pipes 36. The larger diameter enables the gasket 68 to be placed inside the round opening 64 and allows the distribution pipe 36 to be slid through the opening 64.

The filter bed connectors 52 also comprise a rounded exterior flange 62 which has two raised portions 70 and at least two notches 72, or at least four notches 72 when used to adjoin filter beds 10. The raised portions 70 of the flange 62 are positioned to fit snugly underneath grooves 74 provided in the lip 76 of the exterior side walls 56 of the filter bed housing 50. The notches 72 are positioned to receive drip edges 78 on the underside of the filter bed covers 54. This interconnection between the notches 72 and the drip edges 78 act to stabilize adjoining covers 54 against the exterior flange 62 of the filter bed connectors 52. This connection also allows the filter bed cover 54 to mate flush against the exterior flange 62 of the filter bed connectors 52. By applying a sealant to the top side 82 of the flange 62, a water tight bond between the flange 62 and the filter bed cover 54 can be formed.

FIGS. 5 and 6 illustrate the filter bed cover 54 being the same length as the filter bed housing 50, typically twenty (20) feet. When the filter beds 10 are adjoined to one another, the filter bed cover 54 of one filter bed 10 abuts against the filter bed cover 54 of the adjoining bed 10 at the center of the exterior flange 62 of the filter bed connectors 52. The covers 54 are securely attached to the side walls 56 of the filter bed housing 50 by a lineal clip 79 which has an inner portion 80 and an outer portion 81. The inner portion 80 is designed to fit underneath the groove 74 in the lip 76 on the side walls 56 of the housing 50 while the outer portion 81 of the linear clip 79 fits over the lip 76. The fit between the inner portion 80 and the groove 74 and fit between the linear clip 79 and the lip 76 is preferably an interference or friction fit, which may be reinforced by epoxy or other like substance.

Additionally, as shown in FIG. 6, the filter bed covers 54 are equipped with vent risers 69 having vent holes 65, the vent holes 65 allowing for the receipt of air vents 67. By connecting the air vents 67 to the vent riser 69, the filter beds 10 are allowed to emit air into and receive air from the environment. Typically, only the first and last filter bed covers 54 in each series of filter bed sections 10 are equipped with a vent riser 69 for receiving an air vent 67. The exposed end of the air vents 67 is then equipped with a non-corrosive screen secured to the end with a stainless steel hose clamp. The air vents 67 are generally constructed of PVC pipe.

With the exception of the gaskets 68, which are typically constructed of a synthetic rubber, the filter bed housing 50, filter bed covers 54 and filter bed connectors 52 are typically constructed of a high density polyethylene resin material or other like material that is strong, durable and somewhat flexible. Because the construction material is somewhat flexible, support members 84 may be placed at regular intervals across the interior of the filter bed housing 50 from side wall 56 to opposing side wall 56. See FIGS. 3a and 6. Additionally, each of these three components (i.e. cover 54, housing 50 and connector 52) are typically independently monolithic in construction, but may be collectively monolithic in construction.

While the filter bed base 60 can be used separate and apart from the filter bed housing 50, the present invention provides a filter bed 10 having a filter bed base 60 as an integral component of the filter bed housing 50. As illustrated in FIGS. 3a and 4, the filter bed base 60 of the present invention is divided into three separate compartments: an interior return channel 86, and two surrounding discharge chambers 88. In the illustration, the interior return channel 86 has a width which is approximately 80 percent that of the width of the base 60, and the remaining 20 percent of the width is comprised of the two discharge chambers 88, which surround the return channel 86. One discharge chamber 88 is placed on each side of the return channel 86. The placement, width and number of each channel may, however, vary from the illustration.

The base 60 has an upper surface 90 forming the bottom portion of the housing. In this illustrated embodiment, the upper surface 90 separates the filter media 48 from the discharge chambers 88 and return channel 86. As shown in FIG. 4, this upper surface 90 has a plurality of uniformly positioned orifices 92 (i.e. small openings or holes) which function to distribute the filtered effluent between the return channel 86 and the discharge chambers 88. FIG. 4 illustrates an orifice layout which demonstrates how the orifices 92 may be positioned to distribute the filtered effluent between the discharge chambers 88 and the return channel 86. In FIG. 4, eighty percent of the orifices 92 are located over the return channel 86 and the remaining 20 percent of the orifices 92 are split between the two discharge chambers 88. While this embodiment uses the positioning of the orifices 92 to distribute the filtered effluent, one may also vary the area of the orifices 92 to distribute the filtered effluent between the discharge chamber 88 and the return channel 86.

Like the upper surface 90 of the filter bed base 60, the discharge chambers 88 have a plurality of discharge orifices 94 (i.e. small openings or holes) which are located on either (1) the exterior sides 96 of the discharge chambers 88, as shown in FIGS. 3, 4 and 6, or (2) on the lower surface 98 of the filter bed base 60 directly below the discharge chambers 88. These discharge orifices 94 allow the filtered effluent which is collected in the discharge chambers 88 to be released directly into the soil underlying the filter bed base 60. As illustrated in FIG. 6, these discharge orifices 94 are evenly spaced across the entire length of the exterior sides 96 of the discharge chambers 88. The even spacing across the length of the filter base 60 promotes the more even distribution of effluent in the soil.

Unlike the effluent in the discharge chambers 88, the effluent collected in the return channel 86 is discharged through a channel extension 100, which is monolithic to the filter bed base 60. The channel extension 100 provides an extension opening 102 which allows the effluent collected in the return channel 86 to exit the filter bed base 60. When a filter bed is used alone, the channel extension 100 attaches to a pipe adaptor 104 which feeds the effluent into the wastewater return system 106.

Also provided in each filter bed base 60 is a channel opening 108, which is located on the end panel 58 of the filter bed base 60 opposite the channel extension 100. This allows for the connection of the filter beds 10 in series. When connected in series, the channel extension 100 of one filter bed base 60 fits into the channel opening 108 of an adjoining filter bed base 60. The effluent in the return channel 86 of one base 60 can then flow through the return channel 86 of the adjoining base 60, toward the wastewater return system 106.

In order to properly adjoin the filter beds 10, the channel opening 108 is cut to the inside dimensions of the return channel 86 and the channel extension 100 is designed to enable the channel extension 100 to slide directly into the channel opening 108 of an adjoining filter bed 10, yet fit snugly within the return channel 86 of such adjoining bed 10. It is understood that when only one filter bed 10 is used or when a filter bed 10 is at the end of a series of beds 10, the channel opening 108 will be capped and sealed. Likewise, when the filter bed 10 is first in a series of beds 10, it is understood that the channel extension 100 fits into the pipe adaptor 104 of the return system 106 rather than a channel opening 108 of another filter bed 10. Again, the channel opening 108 is only cut to the dimensions of the return channel 86 so that the discharge chambers 88 of each filter bed base 60 remain closed off from the discharge chambers 88 of any adjoining filter bed base 60. Preventing the effluent collected in the discharge chambers 88 from being exchanged between filter beds 10 forces the effluent to be discharged underneath the bed 10 in which the effluent was collected, and thereby promotes more even distribution of effluent into the environment.

As illustrated in FIGS. 1 and 2, the wastewater return system 106 is comprised of a variety of components, typically composed of 4 inch diameter PVC pipes. These components provide gravity flow from the return channel 86 of the filter bed base 60 back to the pumping chamber 14. The return system 106 is comprised generally of a pipe adaptor 104, return elbows 110, a return tee 112 and a gravity drain pipe 114. It is recognized that the return elbows 110 and return tee 112 are only necessary when using filter beds 10 aligned parallel to one another. When the beds 10 are aligned in series or when using only a single filter bed 10, the return system 106 only requires the use of the pipe adaptor 104 and gravity drain pipe 114.

In operation, the wastewater from a dwelling, business or like environment, flows through the inlet pipe 16 and into the septic tank 12. The wastewater entering the septic tank 12 then passes underneath the inlet baffle 18 and outlet baffle 20. While traversing the inlet baffle 18 and outlet baffle 20, the majority of the solids in the wastewater settle out. The solids that remain, however, are prevented from entering the discharge chamber by the mesh filter fabric 24 which covers the bottom and sides of the removable tee fitting 22.

After flowing through the removable tee fitting 22, the wastewater enters the pumping chamber 14, where the pump 30 directs the wastewater through a primary distribution pipe 32. Once outside the pumping chamber 14, the primary distribution pipe 32 then splits into secondary distribution pipes 36 which transport the effluent to the filter beds.

Once over the filter media 48, the distribution pipes 36 discharge the effluent through a series of pressurized orifices 44. A low hydraulic pressure is applied to the distribution pipes 36 to evenly distribute the effluent across the filter media 48. Upon discharge, the effluent sprays against the underside of the filter bed cover 54. The effluent is prevented from running to the edges of the filter bed cover 54 by drip edges 78, which also function to promote the even distribution of effluent over the surface of the filter media 48 and provide added rigidity to the filter bed cover 54. Once the effluent has trickled through the filter media 48 and reached the upper surface 90 of the filter bed base 60, the effluent is distributed between the return channel 86 and the discharge chambers 88 by a series of distribution orifices 92 which are positioned on the upper surface of the filter bed base 60. The percentage of the effluent which is collected in the discharge chambers 88 is discharged through discharge orifices 94 into the gravel and/or soil underlying the filter bed 10. However, the percentage of effluent which accumulates at the bottom of the return channel 86 flows through a pipe adaptor 104 and into the return system 106 where the effluent is then recirculated through the pumping chamber 14 and returned to the filter beds 10 until the effluent is accumulated in the discharge chambers 88 and released into the environment. Upon final exit of the system, the effluent is greatly reduced in BOD5.

As previously discussed, the various components of the filter bed 10 make its installation quite easy. With the septic tank 12 and the pumping chamber 14 already in place, the installation of the filter beds 10 begins with selecting a site to dig a trench, or trenches, for the beds 10. It is recommended that the present invention utilize a total of 14 filter beds 10 (7 per trench) to treat the wastewater generated from a single family home, however, this design can be expanded, reduced or modified to serve a variety of other needs. The trenches should be dug far enough above the pumping chamber 14 to allow the effluent collected in the return channel 86 to gravity flow through the return system 106 to a point above the maximum operating level of the pump 30. Although the bottom of the trenches must be level, the separate trenches do not have to be at the same elevation.

Once the trenches have been dug, gravel is placed in and leveled across the bottom of the trenches. The installation of the filter bed housings 50 then begins by positioning a filter bed housing 50 in each trench so that the channel extension 100 faces toward the pumping chamber 14. Subsequent filter bed housings 50 are installed by inserting the channel extensions 100 of the subsequent filter bed housings 50 into the channel opening 108 of the previous filter bed housing 50. Once the filter bed housings 50 are connected to one another, the filter bed connectors 52 are clipped over the abutting end panels 58. To give the outside end panels 58 of the first and last filter bed housing 50 the same shape and thickness as the abutting interior end panels 58, blanks may be epoxied or otherwise attached to the end panels 58. The blanks provide the same cross section as is shown in FIG. 3b and provide the same stable base as that of two abutting end panels 58. Once the connectors 52 are in place, the gaskets 68 are then installed on the pipe opening 64 of the first and last filter bed connector 52 in each series of beds 10.

With the filter bed housings 50 in place, gravel is poured around the perimeter of each filter bed housing 50. The filter media 48 is then poured into each filter bed housing 50 and distribution pipes 36, having pressurized orifices 44, are inserted through the pipe opening 64 of the filter bed connectors 52. Once the distribution pipes 36 are positioned with the pressurized orifices 44 pointing directly upward, the filter bed covers 54 are then snapped into place. The vent risers 69 and air vents 67 are then installed on the first and last covers 54 in each series of filter beds 10. Finally, the installation is completed by backfing the trenches to the existing grade.

In an alternative embodiment of the present invention, which is not illustrated in any of the figures, the filter bed 10 is a single pass filter bed. Therefore, the filter bed base 60 is comprised only of discharge chambers 88. The return channel 86 and return system 106 are not incorporated into this embodiment. In this embodiment, the use of a pump 30 and pumping chamber 14 is optional. The system may be designed so that the effluent could gravity flow into the filter beds 10.

In yet another alternative embodiment of the present invention, which is not illustrated by any of the figures, the filter bed base 60 has at least one return channel 86 and at least one discharge chamber 88 which, instead of having discharge orifices 94, directs the flow of effluent collected in the discharge chamber 88 to a lateral field or other outlet for discharging the effluent into the environment.

FIGS. 7–12 illustrate still another alternative embodiment of the present invention. In this embodiment, the filter beds 10 are connected to one another by fitted connection panels 116 (i.e. removable end panels). The fitted connection panels 116 combine the features of the end panel 58, filter bed connector 52, and channel extension 100 of the first embodiment to create a filter bed 10 which is more easily assembled and manufactured.

Figure 8:
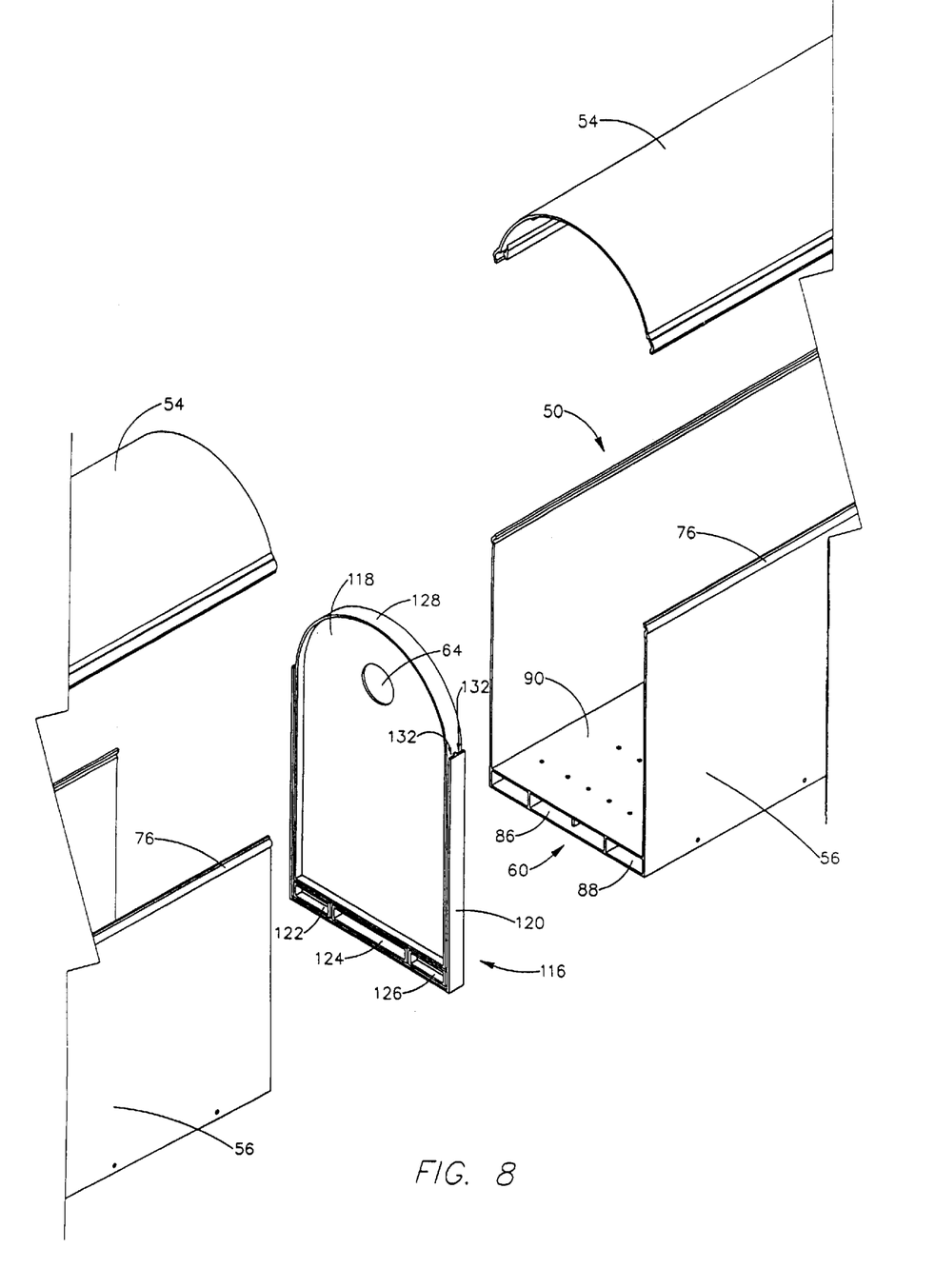
FIG. 8 is an exploded, fragmentary perspective view of the two adjoining filter bed sections illustrated in FIG. 7.
Figure 9:
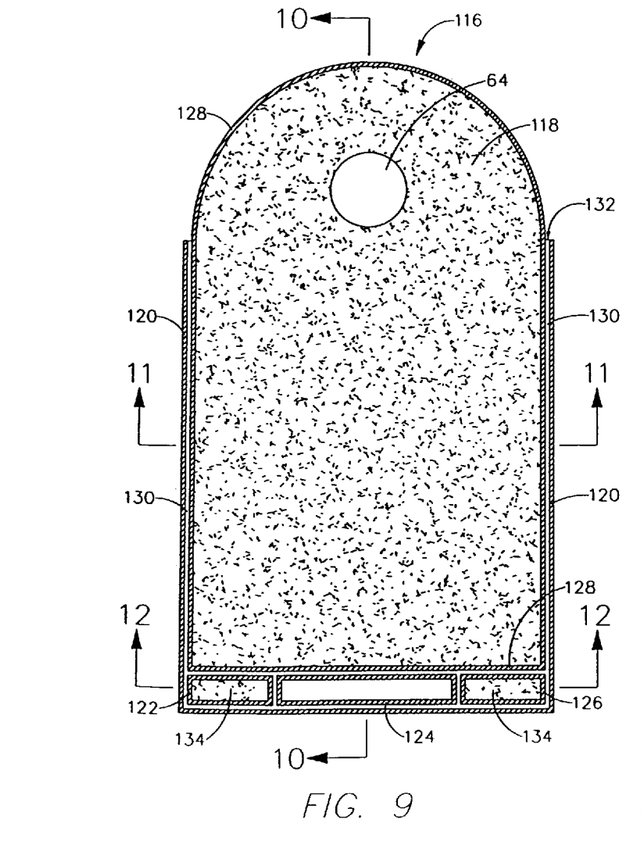
FIG. 9 is a plan view of the fitted connection panel in FIG. 8.
Figure 10:
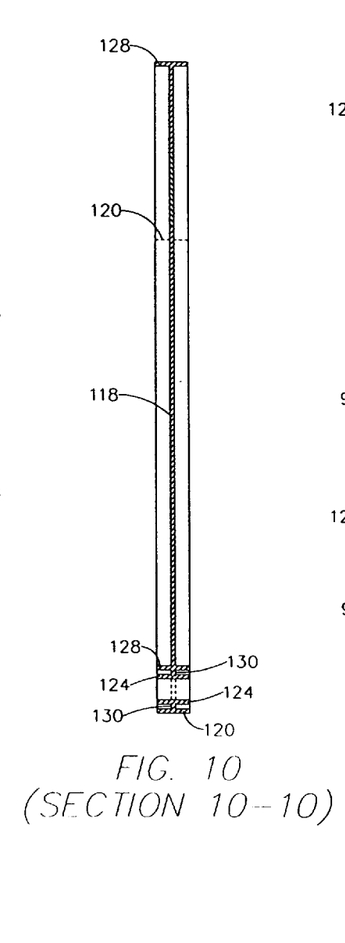
FIG. 10 is a cross section of the fitted connection panel in FIG. 9 taken along line 9—9.

As seen in FIGS. 8 and 9, the fitted connection panel 116 is comprised of an interior panel 118, an exterior flanged edge 120, and three frame members 122, 124 and 126 respectively. As shown by FIG. 8, the interior panel 118 is peripherally surrounded by an interior flanged edge 128 and is dimensioned to abut the interior of the side walls 56 of the filter bed housing 50, the upper surface 90 of the filter bed base 60, and the underside of the filter bed cover 54 when the filter bed 10 is assembled.

Figure 11:
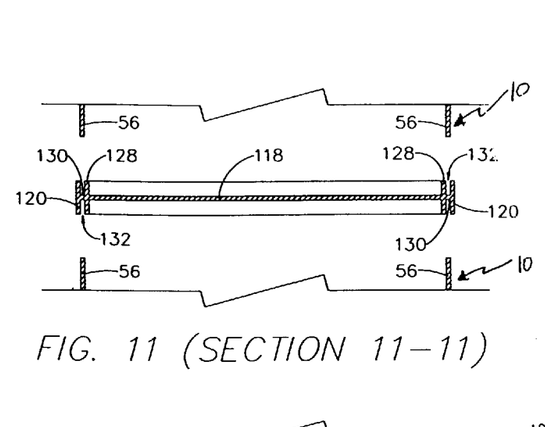
FIG. 11 is a cross section of the fitted connection panel in FIG. 9 taken along line 11—11.
Figure 12:
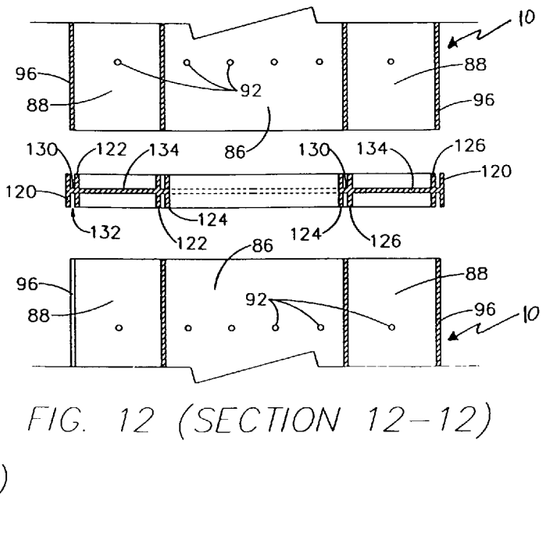
FIG. 12 is a cross section of the fitted connection panel in FIG. 9 taken along line 12—12.

As best seen in FIG. 9, the interior flanged edge 128 is partially surrounded by an exterior flanged edge 120 which is positioned co-planar with and spaced apart from the interior flanged edge 128 of the interior panel 118. A perpendicular web member 130 subtends at least a portion of the space between the interior and exterior flanged edges 128 and 120 forming opposing grooves 132 or recesses which open outward from said web member 130. As seen in FIGS. 9, 11 and 12, this web member 130 extends between the midsections of, and perpendicular to, the interior flanged edge 128 and the exterior flanged edge 120. Thus, the cross-section of the web member 130, interior flanged edge 128 and exterior flanged edge 120 resembles the cross-section of an I-beam. (See FIGS. 11 and 12). Although the thickness of the web member 130 may vary from the thickness of the interior panel 118, the thickness of the web member 130 in this embodiment is the same as that of the interior panel 118.

By connecting the exterior flanged edge 120 and interior flanged edge 128 to one another at their midsections, two opposing grooves 132 of a predetermined width are created between the two parallel edges 120 and 128. As illustrated by FIGS. 8, 11 and 12, these opposing grooves 132 are positioned to receive the end edges of the side walls 56 of two adjoining filter beds 10. The distance between the exterior and interior flanged edges 120 and 128, which define the width of the grooves 132, is such that the side walls 56 of the filter beds 10 fit within the grooves 132 to create a tight friction fit between the fitted connection panel 116 and the side walls 56. Although not demonstrated by any of the figures, this friction fit can be reinforced with additional securing means such as epoxy or latex caulking. In this embodiment, the horizontal length of the exterior edge 120 is approximately equal to that of the interior flanged edge 128 so that the grooves 132 created between the two edges 120 and 128 and the web member 130 have a consistent depth.

Figure 7:
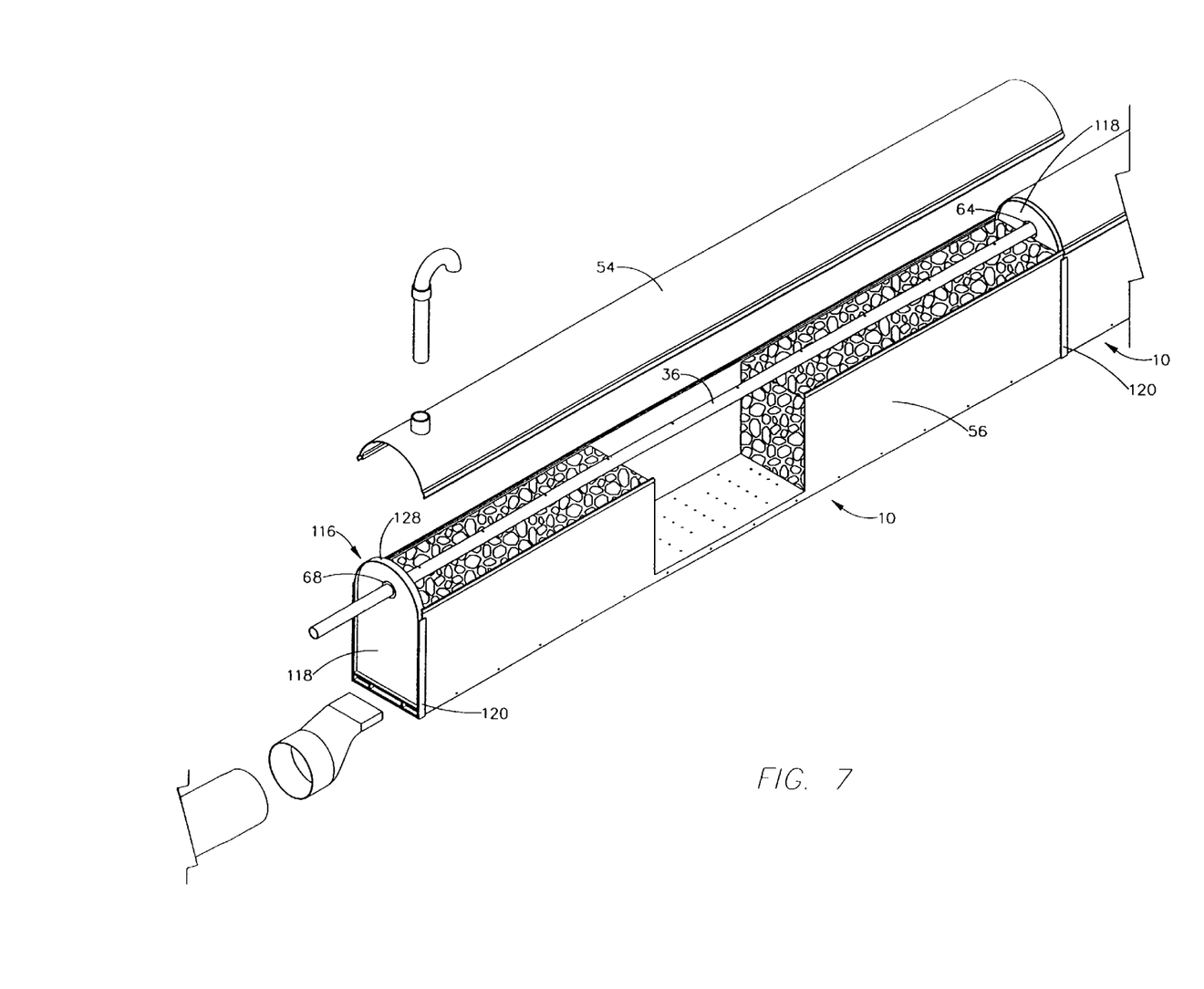
FIG. 7 is an exploded perspective view of an alternative embodiment of the present invention.

FIGS. 7–9 illustrate the exterior flanged edge 120 of the fitted connection panel 116 extending only partially up the sides of the fitted connection panel 116. The exterior flanged edges 120 stop at a point where, when connected to the filter bed 10, the exterior flanged edges 120 sit just under the lip 76 of the filter bed housing 50. This prevents the exterior flanged edges 120 from interfering with the connection of the filter bed cover 54 to the filter bed housing 50.

As illustrated in FIGS. 8, 11 and 12, the fitted connection panel 116 attaches to the base 60 of the filter bed 10 by grooves created by the three frame members 122, 124 and 126 and the interior and exterior flanged edges 128 and 120. These three frame members 122, 124 and 126 are rectangular shaped members which are positioned between the lower exterior flanged edge 120 and the lower interior flanged edge 128 of the interior panel 118. All sides of the frame members 122, 124 and 126 are co-planar with and have a horizontal length equal to that of the interior flanged edge 128 and exterior flanged edge 120 and are spaced at predetermined distances from the interior flanged edge 128 and exterior flanged edge 120. Again, the frame members 122, 124 and 126 are connected to both the interior flanged edge 128 and exterior flanged edge 120 by the web member 130. The web member 130 connects the interior flanged edge 128, exterior flanged edge 120 and frame members 122, 124 and 126 to one another at their midsection to form opposing grooves 132 between the members 122, 124 and 126 and corresponding edges 128 and 120.

The web member 130 is one continuous member throughout the fitted connection panel 116. Thus, the fitted connection panel 116 is formed with corresponding grooves 132 which match the outline of the end edges of the filter beds 10 so that the fitted connection panel 116 can be pressed against the end edges of a filter bed 10 and create a fluid tight friction fit between the fitted connection panel 116 and the filter bed 10. Once the fitted connection panel 116 is positioned on the end edges of one filter bed 10, an adjoining filter bed can then be pressed into the exposed grooves 132 of the fitted connection panel 116. The web member 130 prevents fluid flow between the two adjoining filter beds 10 except through the frame member 124 which fits in the interior of the return channel 86. As shown in FIGS. 9 and 12, the interior of the frame member 124 that fits into the return channel 86 of the filter bed 10 is open so that fluid from one return channel 86 can flow through the return channel 86 of the adjoining filter bed 10 and reach the return system 106. In contrast, the interior of the frame members 122 and 126 which fit into the discharge chambers 88 have interior dividing plates 134 which block the fluid flow from one discharge chamber 88 from flowing into the discharge chamber 88 of the adjoining filter bed 10.

When used in connection with a single pass system which discharges the effluent directly to the environment underlying the bed 10 only after collecting the effluent in a collecting chamber, the fitted connection panel 116 would be entirely closed so that no fluid could be exchanged between the adjoining filter bed sections 10. Similarly, the last fitted connection panel 116 in a series of filter beds 10, regardless of whether the system is a single pass system, is entirely closed so that no fluid is released into the environment through the fitted connection panel 116. In contrast, when used in connection with a filter bed arrangement which does not discharge the effluent into the underlying environment but utilizes at least one return channel 86 and at least one discharge chamber 88 which, instead of having discharge orifices 94, directs the flow of effluent elsewhere, the fitted connection panel 116 would be designed to allow all the effluent collected in both the discharge chamber 88 and return channel 86 of one filter bed 10 to flow into the respective discharge chamber 88 and return channel 86 of an adjoining filter bed 10.

While this embodiment is shown having three rectangular frame members 122, 124 and 126, it is recognized that the number and shape of the frame members will vary depending upon the configuration and number of the return channels 86 and discharge chambers 88 of the filter bed base 60. Similarly, if used in connection with a single pass system which does not utilize a filter bed base 60, but discharges the effluent directly into the underlying environment without first collecting the effluent in a collecting chamber, there would be no need for frame members.

Like the filter bed connector 52 in the first embodiment, the fitted connection panels 116 have a pipe opening 64 for receiving and supporting the distribution pipes 36. Similar to the first embodiment, a gasket 68 is provided around the pipe opening 64 in the first and last fitted connection panel 116 in a series.

Although the foregoing detailed description of the present invention has been described by reference to four exemplary embodiments, and the best mode contemplated for carrying out the present invention has been herein shown and described, it will be understood that modifications or variations in the structure and arrangement of this embodiment other than those specifically set forth herein may be achieved by those skilled in the art and that such modifications are to be considered as being within the overall scope of the present invention. Therefore, it is contemplated to cover the present invention and any and all modifications, variations, or equivalents that fall within the true spirit and scope of the underlying principles disclosed and claimed herein. Consequently, the scope of the present invention is intended to be limited only by the attached claims.

I claim:

1. A wastewater treatment system having a septic tank and a filter bed downstream from the septic tank for collecting effluent being discharged from said septic tank, filtering the effluent, and discharging effluent directly into the underlying environment, said filter bed comprising:

(a) at least one modular housing member, said modular housing member comprising a generally elongated tubular member having at least one open end and a collecting chamber for collecting filtered effluent and discharging at least a portion of said effluent into the environment underlying said modular housing member;

(b) at least one reattachable end panel having recesses corresponding in shape to the at least one open end of said modular housing member; and (c) at least one filter medium in said modular housing member.

2. A wastewater treatment system having a septic tank and a filter bed downstream from the septic tank for collecting effluent being discharged from said septic tank, filtering the effluent and discharging the effluent directly into the underlying environment, said filter bed comprising:

(a) at least one modular housing member comprising a generally elongated tubular member having at least one open end and a collecting chamber for collecting filtered effluent and discharging at least a portion of said effluent into the environment underlying said modular housing member;

(b) at least one reattachable end panel having recesses corresponding in shape to the at least one open end of said modular housing member, the at least one said end panel having opposing first and second recesses for adjoining a first and a second modular housing member, said first recesses corresponding in shape to the at least one open end of said first modular housing member and said second recesses corresponding in shape to the at least one open end of said second modular housing member; and (c) at least one filter medium in said modular housing member.

3. A wastewater treatment system having a septic tank and a filter bed containing filter media downstream from the septic tank for collecting effluent being discharged from said septic tank, filtering the effluent and discharging the effluent from said filter bed, said filter bed comprising:

(a) a generally elongated collecting chamber having at least one open end, said collecting chamber having a means for distributing the effluent being discharged from the filter media into said collecting chamber and a means for discharging at least a portion of said effluent into the environment underlying said collecting chamber; and (b) at least one reattachable end panel having recesses corresponding in shape to the at least one open end of said collecting chamber.

4. A wastewater treatment system as recited in claim 3 wherein said collecting chamber of said filter bed has an upper surface and a lower surface, and said distributing means comprises a plurality of distribution orifices located on the upper surface of said collecting chamber.

5. A wastewater treatment system as recited in claim 3, wherein said collecting chamber of said filter bed has an upper surface and a lower surface and said discharging means is a plurality of discharge orifices located on the lower surface of said collecting chamber.

6. A wastewater treatment system as recited in claim 3, wherein the at least one said end panel of said filter bed has first and second opposing recesses for adjoining a first and a second collecting chamber, said first recesses corresponding in shape to the at least one open end of said first collecting chamber and said second recesses corresponding in shape to the at least one open end of said second collecting chamber.

7. A wastewater treatment system as recited in claim 3, wherein said collecting chamber of said filter bed comprises at least one return channel and at least one discharge chamber.

* * * * *